May 9, 1933.  J. HERMAN  1,908,351
TRANSMISSION MEASURING SYSTEM
Filed Jan. 14, 1932
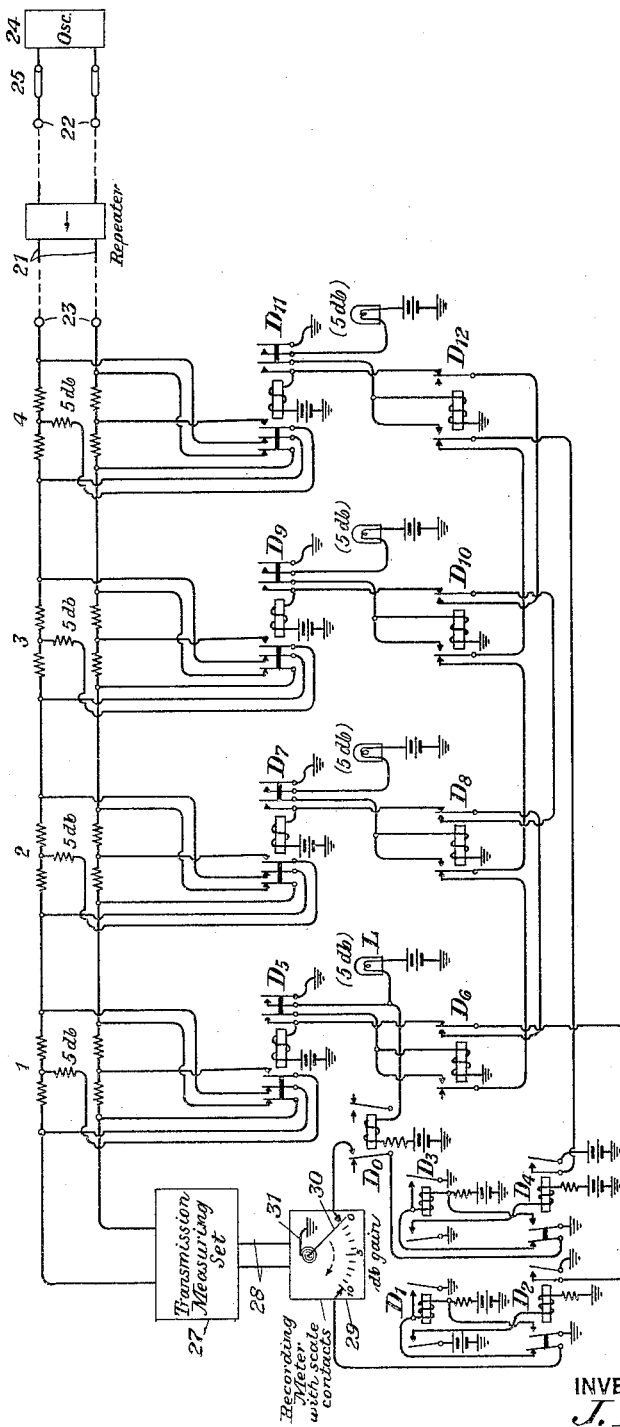
INVENTOR
J. Herman
BY
ATTORNEY Patented May 9, 1933

1,908,351

UNITED STATES PATENT OFFICE

JOSEPH HERMAN, OF WESTFIELD, NEW JERSEY, ASSIGNOR TO AMERICAN TELEPHONE AND TELEGRAPH COMPANY, A CORPORATION OF NEW YORK

TRANSMISSION MEASURING SYSTEM

Application filed January 14, 1932. Serial No. 586,657.

It is one of the objects of my invention to provide a new and improved system for measuring transmission through a signaling circuit or other transducer. Another object of my invention is to provide for indicating an electric current effect by means of a meter having a scale of limited range operating in conjunction with unit devices which increase or decrease the current effect in the meter until it is brought within the proper limited range. Another object of my invention is to provide for measuring transmission in units of "gain" or "loss" by interposing a proper number of loss units so as to bring the residual gain or loss within a certain limited range and indicate this residual gain or loss on a meter of corresponding range. All these objects and various other objects and advantages of my invention, will become apparent on consideration of an example of practice according to the invention which I have chosen for disclosure in this specification. It will be understood that the following description relates principally to this particular example of the invention, and that the scope of the invention will be indicated in the appended claims.

The drawing is a diagram of an apparatus system that may be employed for the practice of my invention.

Referring to this drawing, a telephone line comprising a pair of conductors 21 and which will usually include a number of repeaters, extends between the terminals 22 at one end and the terminals 23 at its other end. It is desired to measure the gain or loss of intensity in transmission on this line. For this purpose an oscillator 24, giving current of definite frequency and intensity, is connected through the switches 25 to the line terminals 22, and the transmission measuring system of my invention is connected to the output terminals 23 that deliver the energy transmitted over the line 22.

Four networks numbered 1, 2, 3 and 4 are provided in tandem arrangement with switches controlled by the respective relays $D_5$, $D_7$, $D_9$ and $D_{11}$ so that these networks or pads as they are called, may be cut in or out of the circuit 26 extending from the terminals 23 to the transmission measuring set 27. This transmission measuring set comprises an amplifier with adjustable gain and a rectifier so that a suitable measurable current goes from its output conductors 28 to the recording and/or indicating meter 29. This current through the output conductors 28 from the measuring set 27, is definitely related to the input current through the conductors 26 so that the measurement in the meter 29 corresponds to the intensity in the conductors 26.

The index arm 30 of meter 29 has a range corresponding to 10 decibels of gain, as indicated on the scale shown in the drawing. At the ends of this scale, that is at the points where the scale reads 0 db. and 10 db. contacts are provided as shown, and the index has ground connection at 31.

The circuits comprising these contacts control certain relays, the structural arrangement being apparent on the drawing, so that we may properly proceed at once to a description of the operation of the system. Briefly stated, when the transmission measuring set 27 has its normal adjustment, the meter 29 measures directly any gain from 0 to 10 db. in the current at the terminals 23, as compared with the input at the terminals 22 from the standard oscillator 24; but if the gain is more than 10 db. the system operates automatically to cut in one or more of the pads 1, 2, 3 and 4, thus introducing 5 db. loss units in sufficient number until the residual gain at the meter 29 lies between 0 db. and 10 db.; then the total gain is read off by adding 5 db. for each of the effective pads 1, 2, 3 or 4, and the reading in the meter 29.

As shown in the drawing, all the pads are now out of circuit, and the index 30 rests against its lower contact. This is the condition when no current is entering the system through the terminals 23.

When current of sufficient value is applied to the input of the measuring set, the meter needle will move to the upper or 10 db. end of its scale and make contact at that point. This will connect ground to the winding of relay $D_1$ and lock up the relay through its right-hand contact. The left-hand contact of the relay will connect battery to relay $D_2$ causing this relay to operate and short-circuit the winding of relay $D_1$ by means of one of its left-hand contacts and open the circuit to the meter needle by means of the other left-hand contact. The short-circuiting of $D_1$ causes this relay to release which will in turn release $D_2$. The operation will be repeated as long as the meter needle remains on its contact. The relays $D_1$ and $D_2$ are slow release relays so that the pulsing action resulting from the above operation will be fairly slow.

The operation of $D_2$, in the manner described above, connects ground by means of its right-hand contacts and through the right-hand contacts of relay $D_6$, to the winding of relay $D_5$. Relay $D_5$ is thereby operated and connects its winding to the winding of relay $D_6$. The latter relay is short-circuited, however, and cannot operate as long as $D_2$ remains closed. When $D_2$ opens, ground is removed from the connection between the windings of $D_5$ and $D_6$ allowing the latter relay to be operated by current flowing in series through the windings of the two relays. The operation of $D_5$ lights a lamp and also operates relay $D_0$. The latter closes the circuit between the lower or 0 db. scale-contact and its pulsing relays, permitting these relays to be operated if the meter needle subsequently makes contact at the lower or 0 db. end of its scale.

The operation of $D_6$ transfers the contact of relay $D_2$ in series with the contacts of relay $D_8$, to the winding of relay $D_7$. Should relay $D_2$ again close, relay $D_7$ would be operated and upon the opening of $D_2$ relay $D_8$ would be operated, transferring the connection to relay $D_9$. These operations will continue, connecting in one pad at a time, until sufficient loss has been introduced into the circuit of the transmission measuring set so that the meter needle will open its upper or 10 db. contact and stop the pulsing of relays $D_1$ and $D_2$.

Should the current be reduced, for some reason or other, so that the meter needle makes contact at the lower or 0 db. end of its scale, relays $D_3$ and $D_4$ will start pulsing in the same manner as described for relays $D_1$ and $D_2$. Whenever relay $D_4$ is operated, battery is connected by means of its right-hand contact and the left-hand transfers of the various auxiliary relays $D_{12}$, $D_{10}$, $D_8$ and $D_6$ to the winding of that one of the relays $D_5$, $D_7$, $D_9$ and $D_{11}$, which was last operated. The battery (near $D_4$) is connected in such a manner as to buck the battery energizing the relay controlling the 5 db. pad, thereby causing it to release. The auxiliary relay associated with that pad, is held operated, however, until $D_4$ releases. Upon the release of $D_4$ the auxiliary relay will also be released thereby switching the connection of $D_4$ to the relay which is holding the next pad in the circuit. This operation will continue as long as the meter needle remains on its lower contact or until all the pads have been switched out of the circuit.

When all the pads are switched out of the circuit, as will be the case when the current is disconnected from the transmission measuring set and the set left idle, means must be provided to prevent the relays $D_3$ and $D_4$ from pulsing continuously. The relay $D_0$ has been added for this purpose. This relay is released when relay $D_5$ releases to switch the last pad out of the circuit, thereby opening the circuit of the pulsing relays $D_3$ and $D_4$ to prevent their continued operation. As described previously $D_0$ is again closed as soon as the first pad is switched into the circuit by relay $D_5$.

With the system that has been described, it will be seen that gains up to 30 db. can be measured, 5 db. in each of the four pads 1, 2, 3 and 4, and up to 10 db. added thereto as read directly from the scale of the meter 29. It will readily be understood that the number of the pads 1, 2, 3 and 4 can be increased to reach any desired range. It is much easier to construct a meter with a moderate range, such as 0 to 10 db. and having a high degree of accuracy, than to construct a meter of greater range, such as 30 db. or more and with an equal range of accuracy. Moreover, in different situations different total ranges will be desirable, but with the system of my invention the meter 29 may be the same in all cases, and the proper total range will be obtained by employing a corresponding number of pads such as 1, 2, 3 and 4.

From the foregoing description it will be seen that there is a separate lamp L for each pad and each lamp is lighted when its associated pad is connected into the circuit. Since the pads are switched out of the circuit in reverse order as compared with the order in which they are connected into the circuit, the lamps can be designated in ascending multiples of 5 db. Then the highest number shown by a lighted lamp will indicate directly the total value of the pads connected into the circuit. These numbers are given in parentheses beside the given lamps L.

This switching arrangement disclosed in the drawing and in the foregoing description has been presented as primarily for use with an indicating or a recording meter such as the meter 29 to measure gain only. But it will be readily understood that it can be used also for measuring loss. A method of doing this is to increase the gain of the adjustable amplifier in the transmission measuring set 27 by a definite number of db., as for example, 30 db. The loss in any particular circuit would then be the difference between 30 db. and the indication of the lamps plus that of the meter. With such an arrangement, losses from 0 to 30 db. could be measured. The range covered by the meter and lamps could also be made to include both loss and gain, as for example, when the gain of the transmission measuring set 27 is increased by only 20 db., in which case the arrangement would measure losses from 20 db. to zero and gains from zero to 10 db.

I claim:

1. In combination, a current meter comprising a movable index having a certain range, a pair of current input terminals for said meter, a contact at an end of said range adapted to be engaged by said index, means to change the effectiveness in the meter of current applied thereto through said terminals, and a circuit controlling said means and comprising said index and content.

2. In combination, a current meter comprising an index having a certain range, a pair of current input terminals for said meter, a contact at an end of said range adapted to be engaged by said index, a plurality of units of apparatus each adapted to be connected to change the effectiveness in the meter of current applied thereto through said terminals, a circuit comprising said index and contact, and means controlled by said circuit to count said units successively in or out of connection.

3. Means to measure transmission through a transducer comprising means to apply current of standard frequency and intensity to the transducer input, amplifying and rectifying means connected to the transducer output, a current meter connected to said last-mentioned means, a series of loss pads, relays to connect them in or out between the said transducer and said amplifying and rectifying means, means to operate said relays, and a circuit for said last mentioned means having a contact positioned to be engaged by the meter index at one end of its range.

4. In combination, an electric current meter having an index movable over a certain range, a pair of input terminals therefor, a plurality of loss pads adapted to be interposed between said terminals and said meter, contacts positioned at the ends of the range of the meter index, circuits comprising said contacts, and counting means to cut the said pads in successively while the meter index lies against one of said contacts, and to cut them out successively while it lies against the other such contact.

In testimony whereof, I have signed my name to this specification this 13th day of January 1932.

JOSEPH HERMAN.